United States Patent [19]

Yamamoto

[11] 4,285,566
[45] Aug. 25, 1981

[54] OPTICAL SCANNING APPARATUS

[75] Inventor: Shigeyuki Yamamoto, Kure, Japan

[73] Assignees: Agency of Industrial Science & Technology; Ministry of International Trade & Industry, both of Tokyo, Japan

[21] Appl. No.: 119,783

[22] Filed: Feb. 8, 1980

[30] Foreign Application Priority Data

Mar. 30, 1979 [JP] Japan ................... 54/38849

[51] Int. Cl.³ ............................................. G02B 27/17
[52] U.S. Cl. ........................................................ 350/6.6
[58] Field of Search ................. 350/6.6, 6.5; 250/235, 250/230, 231 SE; 358/208

[56] References Cited

U.S. PATENT DOCUMENTS

| 2,971,429 | 2/1961 | Howerton | 250/235 |
| 2,989,643 | 6/1961 | Scanlon | 350/6.6 |

FOREIGN PATENT DOCUMENTS 3929022 12/1964 Japan ........................ 350/6.6

*Primary Examiner*—Jon W. Henry
*Attorney, Agent, or Firm*—Kurt Kelman

[57] ABSTRACT

An optical scanning apparatus formed by combining a reflector and a frame in a gimbal construction and having two heart cams held in contact respectively with the reflector and the frame. The heart cams, when rotated each in a fixed direction, impart longitudinal and lateral oscillations to the reflector, enable the incident beam such as of an ultraviolet beam to provide planar scanning of the surface of a given test specimen and, at the same time, permit signals detected in the form of the amounts of oscillations of the reflector to be utilized as output signals for synchronization with a CRT.

2 Claims, 7 Drawing Figures

Fig_1(A)
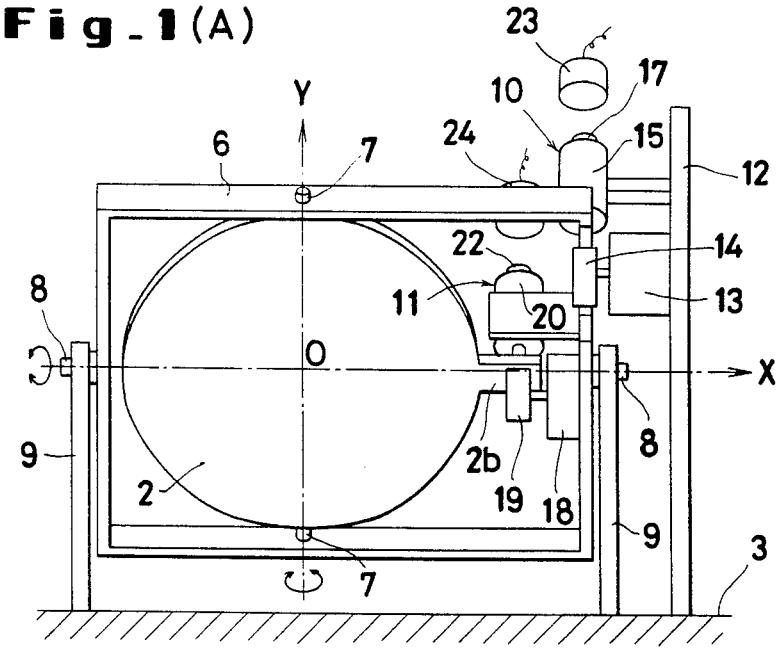
Fig_1(B)
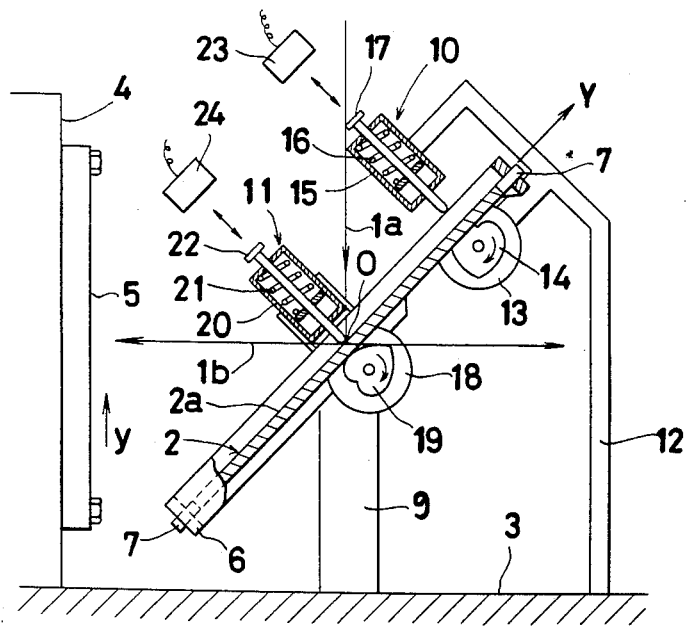

Fig_3(A)
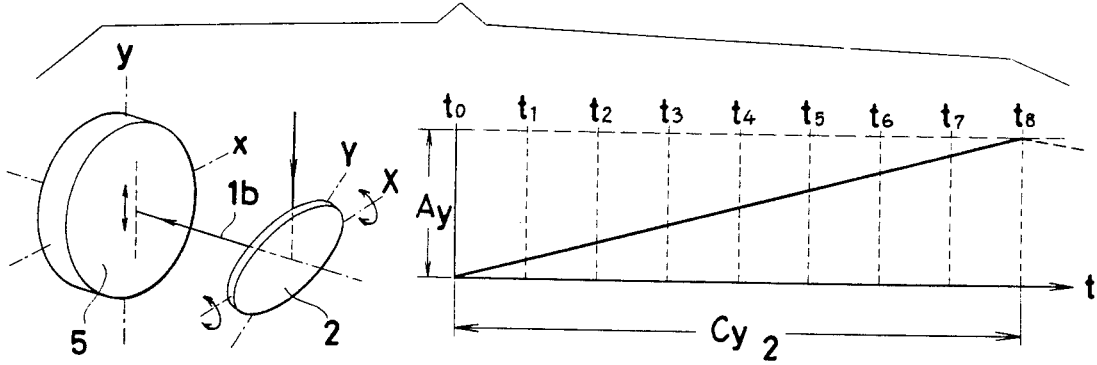
Fig_3(B)
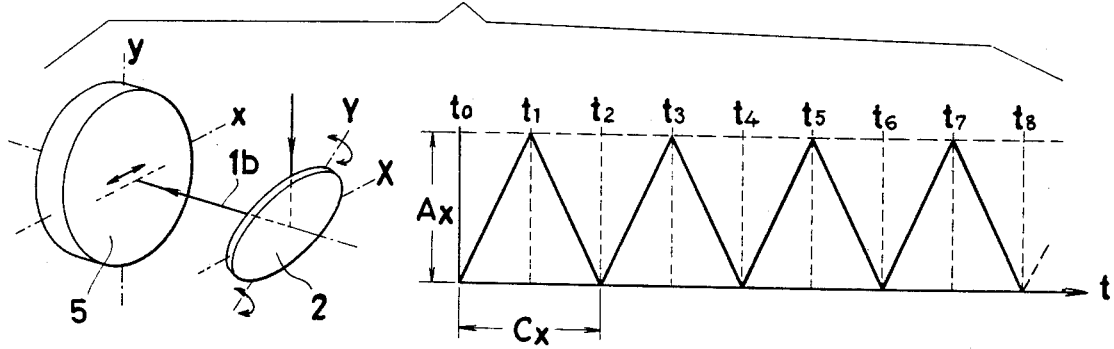
Fig_3(C)
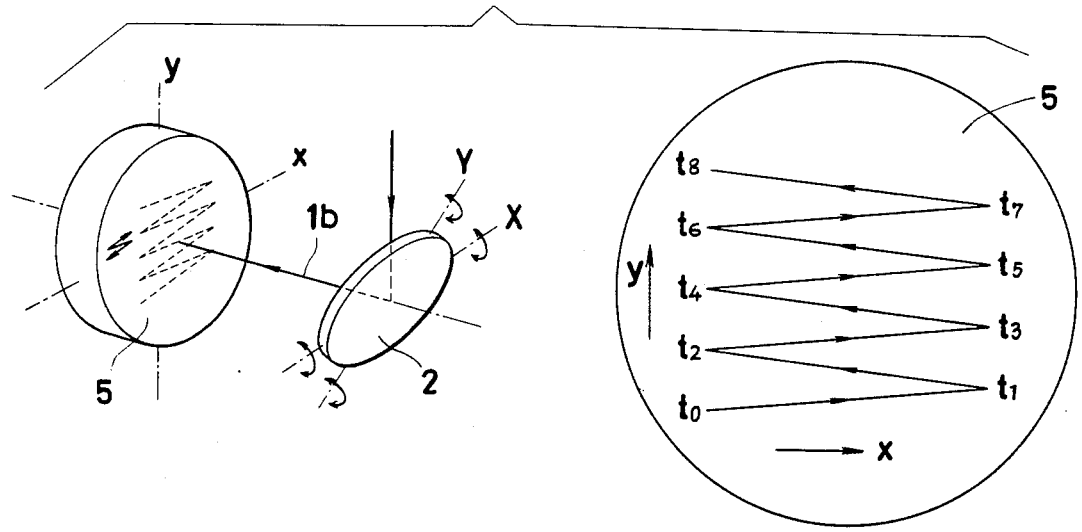

OPTICAL SCANNING APPARATUS

BACKGROUND OF THE INVENTION

This invention relates to an optical scanning apparatus for the planar scanning of a given test specimen with a beam of light such as an ultraviolet ray which is electromagnetically uncontrollable.

Among the microscopes which are capable of magnifying a given test specimen with sufficiently high resolvability to permit visual observation, there are included microscopes of the type which make use of an electron beam. In the scanning electron microscope which is typical of these microscopes, the observation of a given test specimen is accomplished by concentrating the primary electron beam into a small focal point, causing the focused electron beam to scan the surface of the test specimen regularly and repeatedly, collecting the secondary low-energy electrons produced by the interreaction between the incident electron beam and the test specimen, modulating the collected secondary electrons as an electric signal in terms of the brilliance of the cathode-ray tube (hereinafter referred to as "CRT") and, thereby, enabling the test specimen to be viewed in a magnified image. The primary electron beam which is used in this type of microscope is first deflected by the Lorenz force in the electromagnetic field which is generated by application of an exciting current to a deflecting coil and then used to scan the surface of a given test specimen. Having no need for any mechano-optical driving device, this method of scanning can be easily operated with high accuracy at a high speed. Although the scanning electron microscope operated by this principle enjoys high resolving power, microscopes having still higher degrees of resolving power have been desired in various technical fields. To meet this desire, there has been proposed a new type of microscope which uses an ultraviolet beam as the source of irradiation in the place of the electron beam. The reason for this switch in the source of irradiation is that the resolving power such as is obtained in the microscope depends on the wavelength of the source of irradiation. In this respect, it is reasonable to conclude that light in the ultraviolet zone, which has smaller wavelength, is effective in increasing the resolving power. Besides, ultraviolet beam is characterized by possessing higher energy and suffering from a lower attenuation factor.

In this type of microscope, when the test specimen is irradiated by electrons as the source of irradiation, secondary electrons consequently emitted from the surface of the test specimen are collected. When the ultraviolet beam is used as the source of irradiation, there ensues generation of exoelectrons from the surface of the test specimen. For the two types of radiant beams, although the treatments to which they are subjected are virtually identical, the methods by which they are utilized for scanning the surface of the test specimen are different. The electrons can be electromagnetically controlled such as with a deflecting coil, whereas the light of the ultraviolet zone used as the source of irradiation cannot be electromagnetically controlled.

For the planar scanning of the test specimen to be effectively carried out by using, as the source of irradiation, the beam of an electromagnetically uncontrollable light such as the ultraviolet light, it has been customary to adopt either a method which causes the test specimen to be mechanically moved relative to the path of the light beam or a method which optically deflects the incident ultraviolet beam. Generally, the former method which requires the test specimen to be moved by a suitable driving device and permits the incident ultraviolet beam to be kept stationarily is adopted more often than the latter method. In the former method of scanning, however, the test specimen itself must be moved and, therefore, must be provided with an external load function. This method, accordingly, has the disadvantage that the driving device inevitably incorporated is too massive to permit speedy scanning of the test specimen.

In order for the latter method to be advantageously adopted, there has been conceived an idea of utilizing a reflecting mirror which is disposed across the optical axis of the incident ultraviolet beam and adapted to be oscillated by some suitable means. In this connection, optical scanning devices applicable to the aforementioned scanning microscopes have been proposed. None of these devices, however, have structures which are suitable for practical uses. Since, in the microscope, the image of the test specimen to be observed therethrough is reproduced by the CRT, the reflecting mirror is required to be linearly oscillated so as to permit ready synchronization with the CRT scanning and provides high-speed linear scanning of the test specimen. In actuality, however, one of these optical scanning devices produces an elliptic locus of scanning on the surface of the test specimen, which is not suitable for the purpose of synchronization with the CRT (Japanese Patent Publication No. 29022/1964) and another of them utilizes a multiplicity of toothed wheels as means for the oscillation of the reflecting mirror at the cost of operating speed and produces a locus of scanning in the shape of a sine curve which similarly is undesirable for the purpose of synchronization with the CRT (Japanese Patent Public Disclosure No. 17244/1974). There has also been proposed a concept of adopting an optical system incorporating two or more reflecting mirrors. None of the devices so far proposed, however, has fulfilled the ideal of enjoying simplicity of structure, exhibiting linearity of scanning speed and providing accurate, high-speed scanning.

The scanning devices developed to date have a serious disadvantage that no free variation can be obtained either in the motion of the reflecting mirror or in the area of scanning zone of the linear density of scanning.

The object of this invention is to provide an optical scanning apparatus which utilizes for the planar scanning of a test specimen the beam of an electromagnetically uncontrollable light, specifically the ultraviolet light, and which provides accurate, high-speed scanning with ample speed linearity and permits free variation in the area of scanning zone and the linear density of scanning.

SUMMARY OF THE INVENTION

To accomplish the object described above according to the present invention, there is provided an optical scanning apparatus which comprises a reflector serving to reflect an incident beam of light and throw it upon a given test specimen; a gimbal frame pivotally supporting the reflector rotatably around an axis parallel to the reflecting surface of the reflector and fastened rotatably around an axis perpendicular to the axis of rotation of the reflector; a cam device consisting of a heart cam held in contact in one directon with the reflector; and a cam device consisting of a heart cam held in contact in one direction with the gimbal frame.

The two heart cams mentioned above have their contours designed so as to describe an Archimedes' spiral symmetrically with respect to a specific line. When these cams are rotated, therefore, the reflector produces a motion which results from the combination of the oscillations generated in the two axes. This motion causes the beam of light impinging upon the reflector to produce scanning of specific speed linearity regularly and repeatedly on the surface of the test specimen. Since the two cams each rotate in one fixed direction, they can cause the reflector to be oscillated at a high rate of speed. Further, the scanning density obtained with the optical scanning apparatus can be easily varied by suitably selecting the rate of rotation of either or both of the two heart cams and the area of scanning zone in which the test specimen is desired to be observed can easily be varied by suitably selecting the sizes of the cams. In other words, suitable selection of the rates of rotation of the cams and/or the sizes of cams permits free selection of the resolving power and the magnifying power of the microscope. Moreover, in the observation of the test specimen with the aid of the CRT, required synchronization of the scanning of the optical scanning apparatus with the scanning of the CRT can easily be obtained through detection of the displacement in a pair of retention pins opposed to the cams to serve to hold down the surface of the reflector.

The other objects and characteristics of the present invention will become apparent from the further disclosure of the invention to be given hereinafter with reference to the accompanying drawing.

BRIEF EXPLANATION OF THE DRAWING

FIGS. 1(A) and 1(B) are a front view and a side sectioned view of one preferred embodiment of the optical scanning apparatus according to the present invention.

FIGS. 3(A) through 3(C) are schematic representations of beam reflection and kinetic graphs, respectively illustrating the conditions of scanning resulting from the motion of the reflector in the optical scanning apparatus according to the present invention.

DESCRIPTION OF THE PREFERRED EMBODIMENT

Figure 2:
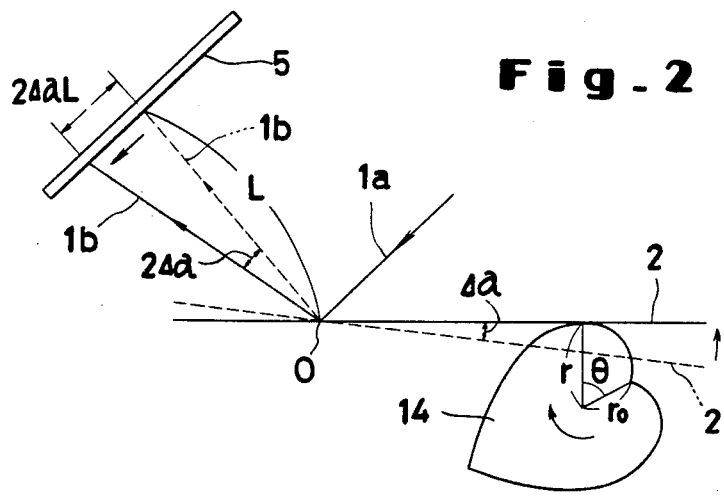
FIG. 2 is an explanatory diagram illustrating the operation of the apparatus of FIG. 1.

This invention relates to an optical scanning apparatus for providing planar scanning of a given test specimen under a scanning microscope by use of a beam of an electromagnetically uncontrollable light, specifically an ultraviolet beam.

FIG. 1 represents one preferred embodiment of the optical scanning apparatus according to the present invention. The incident beam 1a, such as an ultraviolet beam, as the source of irradiation is reflected by the reflector 2. The resultant catoptric beam 1b irradiates the test specimen 5 held fast against the specimen holder 4 on the base 3. The reflector is pivotally supported so as to be rotated in all the direction on the gimbal frame construction and is caused to be oscillated regularly. Consequently, the beam reflected by the regularly oscillating reflector is caused to sweep the surface of the test specimen 5, providing a planar scanning of the test specimen. The gimbal frame construction is obtained by causing the reflector 2 to be pivotally supported on the frame 6 with a longitudinal support shaft 7 disposed parallelly to the surface of the reflector so as to enjoy freedom of rotation around the longitudinal axis Y and further causing the frame 6 to be pivotally supported on the support column 9 of the base with the lateral stationary shaft 8 so as to enjoy freedom of rotation around the transverse axis X as illustrated in the drawing.

Now that the reflector is rendered freely rotatable in all the directions, it is necessary to give the reflector a specific oscillating motion in order that the incident beam may provide a desired planar scanning of the surface of the test specimen. The aforementioned gimbal frame construction, therefore, is provided with a driving device which satisfies this requirement.

The aforementioned driving device which serves to impart longitudinal and lateral oscillations to the reflector 2 is formed by having disposed at right angles relative to each other the cam device 10 which causes the frame 6 as its follower to be oscillated around the transverse axis X and the cam device 11 which causes the reflector 2 as its follower to be oscillated around the longitudinal axis Y relative to the frame 6. The oscillating motions which are simultaneously produced in the frame 6 and the reflector 2 by the reciprocating motions of the respective cam devices give rise to a complicately combined oscillating motion in the reflector 2 relative to the beam impinging upon the reflector. By suitably controlling the motions of the respective cam devices, therefore, the reflector enables the catoptric beam to provide a desired planar scanning of the surface of the test specimen.

In the cam device 10 which causes the aforementioned frame 6 to be oscillated around the transverse axis X, the motor 13 fastened to the support column 12 of the base 3 and the heart cam 14 fitted to the driving shaft of the motor 13 and adapted to remain in contact with the frame 6 so as to oscillate this frame cooperate as the driving means for the cam device and the retainer pin 17 energized by the spring 16 and projecting from the guide case 15 disposed on the support column 12 serves to keep the frame 6 constantly pressed against the heart cam 14.

In this embodiment, since the heart cams are respectively held in contact with the reflector indirectly via the flat portion of the frame and the reflector, the reflector is not allowed to follow strictly the periphery close to the portion of the shortest radius. Consequently, the accuracy of linear scanning is impaired, though very slightly. To avoid this disadvantage, the portions of the reflector and the frame, with which the heart cams are brought into contact ought to be provided with suitable roller means capable of faithfully following the peripheries of the heart cams. Since the mechanical scanning apparatus of this kind is required to produce a high-speed motion, it is desirable that the reflector and the frame which constitute the moving elements of the apparatus have their masses minimized so that the inertial resistances exerted thereon during the oscillation of the reflector may be decreased as much as possible. By an experiment conducted to determine possible effects brought about upon the optical scanning by the omission of such roller means from the moving elements, it has been ascertained that in the heart cams generally adopted in scanning apparatuses, the difference between the longest radius and the shortest radius is small, the stroke in which the flat contact fails to follow faithfully the periphery of heart cam in the neighborhood of the shortest radius of the heart cam is smaller than the aforementioned difference and, because of such negligibly small stroke, the loss of the accuracy of scanning which occurs at one end of the scanning zone can easily be overcome from the practical point of view. To be specific, this trouble is totally eliminated by adjusting the CRT scanning so that, when the scanning zone of the surface of the test specimen is reproduced on the CRT, the end portion of the scanning in which the accuracy of scanning is impaired for the aforementioned reason will fall out of the image zone on the CRT. By contrast, when the moving elements incorporate the rollers or other similar means and consequently acquire an added mass, possible deformation caused in the scanning due to the inertial resistance brought about by the added mass cannot be corrected. For this reason, the moving elements involved in the illustrated embodiment are not provided with rollers or other similar means. For the sake of better understanding, the invention will be described hereinafter on the assumption that the moving elements of the apparatus faithfully follow the peripheries of the heart cams.

Similarly to the aforementioned cam device 10, the cam device 11 which serves to oscillate the reflector 2 around the longitudinal axis Y is provided with a driving device which consists of a motor 18 and a heart cam 19 rotated by the motor 18. The motor 18 is fastened to the frame 6 and, at the same time, the heart cam 19 is kept in contact with the actuating arm 2b of the reflector 2. From the guide case 20 which is fastened to the frame 6, the retention pin 22 energized by the spring 21 protrudes. By this retention pin 22, the actuating arm 2b of the reflector 2 is kept in contact with the heart cam 19 at all times.

The aforementioned heart cam 14 is designed so that the contour thereof forms a symmetrical Archimedes' spiral with respect to a specific line, namely, that the cam satisfies the relation $r = r_o + k\theta$, wherein $\theta$ represents the angle of rotation of the motor, r the distance between the driving shaft of the motor and the reflector 2, k the constant of proportion and $r_o$ the radius of the basic circle. When the motor is rotated at a fixed rate, therefore, the reflector which is held in contact with the heart cam produces an oscillating motion of speed linearity. When the incident beam 1a impinges upon the center 0 of rotation of the reflector 2, the position irradiated by the catoptric beam 1b on the test specimen 5 separated by the distance L from the center 0 of rotation is shifted by $2\Delta\alpha L$ for a given minute angle $\Delta\alpha$ of rotation of the reflector 2. Thus, the position of irradiation can be moved in direct proportion to the angle $\theta$ of rotation of the motor.

The oscillation which the heart cam 19 imparts to the reflector 2 relative to the longitudinal axis Y is similar to the motion produced relative to the transverse axis X mentioned above. The free rotations obtained relative to the two axes give birth to the gimbal function.

The reflector can be expected to produce a similar oscillation when the reflector 2 is rotatably supported on the frame 6 so as to enjoy freedom of rotation around the transverse axis X and the frame 6 is rotatably supported to enjoy freedom of rotation around the axis Y which is perpendicular to the aforementioned axis X so that the gimbal structure of the aforementioned embodiment may be driven in a state rotated by 90°.

In the optical scanning apparatus possessing the construction described above, when the heart cam 14 is rotated by the motor 13, the frame 6 and the reflector 2 fastened thereto are simultaneously oscillated around the transverse axis X, with the result that the catoptric beam 1b scans the test specimen 5 in the longitudinal direction as illustrated in the schematic diagram of FIG. 3(A). When the other heart cam 19 is rotated by the motor 18, the reflector 2 is oscillated around the longitudinal axis Y and, consequently, the catoptric beam 1b scans the test specimen 5 in the lateral direction as illustrated in the schematic diagram of FIG. 3(B). When the ratio of the rotations of the two heart cams 14, 19 is selected with due consideration to the desired scanning density and the cams are rotated at the respective speeds satisfying this predetermined ratio, the catoptric beam 1b can be caused to provide planar scanning of the entire surface of the test specimen 5 in a waveform locus as illustrated in the schematic diagram of FIG. 3(C).

The speed and density of this scanning depend upon the sizes of the respective heart cams, the revolution numbers of the cams and the ratio of the rotations of the respective heart cams and, therefore, can easily be varied. An operation in which the ratio of the rotations of the heart cams 14, 19 is fixed at 1:8 will be described with reference to the graphs of FIG. 3. When the heart cam 14 completes one half cycle (Cy/2) of rotation in the duration of $t_0-t_8$, the reflector and the retention pin both produce a linear motion with an amplitude of Ay as illustrated in the graph of FIG. 3(A). At the same time, the heart cam 19 completes four cycles (4Cx) of rotation in the duration of $t_0-t_8$ and, consequently, the reflector and the retention pin produce linear reciprocating motion with an amplitude of Ax as illustrated in the graph of FIG. 3(B). The motions produced by the two heart cams are combined and, as a result, the catoptric beam 1b is caused to provide a regular planar scanning of the surface of the test specimen 5 as illustrated in the diagram of FIG. 3(C). As is evident from the foregoing explanation, the scanning density can be varied by suitably changing the ratio of the rotations of the two heart cams.

When the optical scanning apparatus of the construction described above is applied to a scanning microscope, for example, the scanning obtained with this apparatus must be synchronized with the scanning such as of the image producing device such as the CRT. For this purpsoe, therefore, the present embodiment controls the deflection of the CRT by means of the signals representing the oscillation of the reflector 2 through non-contact detection of the reciprocating displacements of the retention pins 17, 22 used in the optical scanning apparatus. For the detection of the displacements of the retention pins, detectors 23, 24 are opposed to the free ends of the retention pins across a fixed space. The present embodiment adopts a displacement meter of the excess-current principle. Any other suitable means may be used insofar as the displacements of the moving elements can be detected without direct contact.

Figure 4:
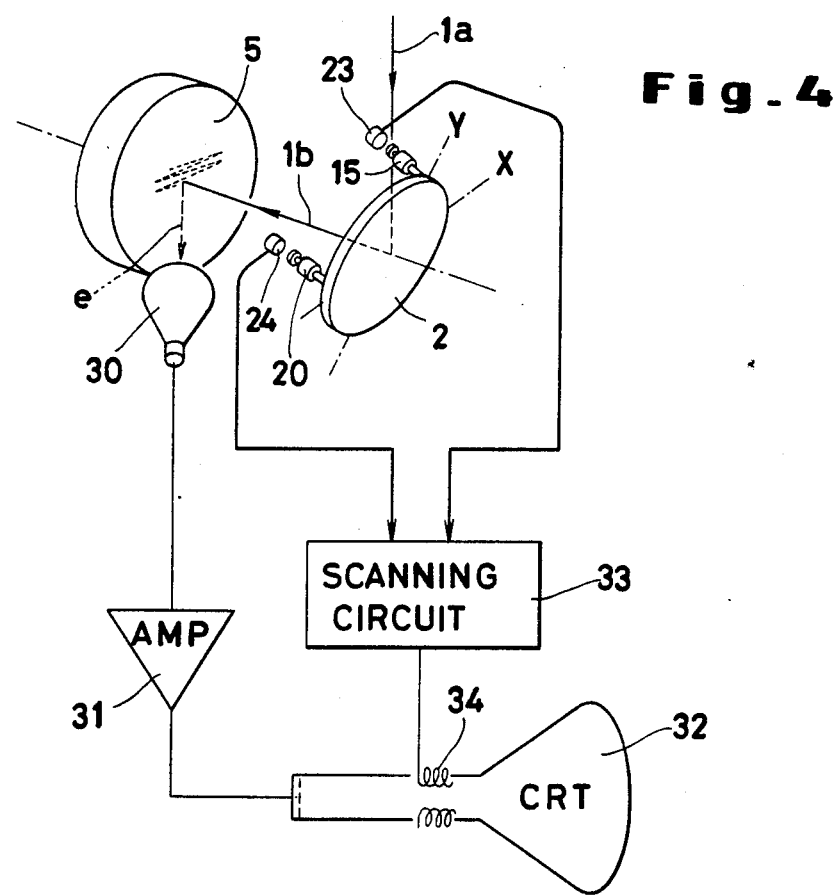
FIG. 4 is a schematic diagram illustrating a typical application of the optical scanning apparatus of this invention to a scanning microscope.

FIG. 4 illustrates one typical application of the optical scanning apparatus of this invention to a scanning microscope. In this case, the construction wherein the signals obtained by collecting the exoelectrons e issuing from the test specimen 5 by the electron collector 30 are transmitted as brilliance-modulating signals to the CRT 32 and, on the other hand, the signals representing the amounts of oscillations produced by the reflector are transmitted to the scanning-signal oscillator 33 and the oscillation signals are conveyed to the deflecting coil of the CRT may be similar to the construction generally adopted for the conventional scanning microscope.

As is clear from the foregoing detailed description, the optical scanning apparatus of the present invention brings about the following effects.

Firstly, since the support shafts for enabling the reflector to be oscillated around two mutually perpendicular axes are fastened to one and the same frame, the accuracy of fabrication and assembly of the two shafts is improved so much as to ensure high accuracy in the planar scanning of the test specimen, with the result that the scanning is accomplished with high resolving power and high reproducibility.

Secondly, the scanning is effected at a high speed because the motors used for rotating the heart cams are rotated each in a fixed direction and need not be rotated reversely.

Thirdly, the linear density of scanning of the test specimen can easily be varied by suitably changing the ratio of the rotations of the two heart cams and the area of the scanning zone on the test specimen can easily be varied by suitably selecting the shapes of the heart cams.

Fourthly, signals corresponding to the positions of scanning on the test specimen can be obtained by detection of the displacements in the longitudinal and lateral oscillations of the reflector and, consequently, the image formed of the points of scanning can be displayed with high accuracy on an image-producing device such as the CRT.

What is claimed is:

1. An optical scanning apparatus for providing planar scanning of a test specimen in a waveform locus with a beam, which comprises a reflector provided with a pair of support shafts parallel to the surface of the reflector and adapted to reflect the beam and throw it upon the test specimen; a frame rotatably supporting thereon the support shafts of the reflector and provided with stationary shafts rotatably fixed perpendicularly to the support shafts of the reflector; a heart cam possessing a contour of the shape of a symmetrical Archimedes' spiral with respect to a specific line and held in direct contact in one direction with the portion of the reflector angularly displaced by one normal angle from the direction of the support shafts of the reflector; a retention pin opposed to the heart cam held in contact with the reflector and serving to energize the reflector in the other direction; a motor means serving to rotate in one fixed direction the heart cam held in contact with the reflector and causing the reflector to be oscillated around the support shafts thereof; another heart cam possessing a contour of the shape of a symmetrical Archimedes' spiral with respect to a specific line and held in direct contact in one direction with the portion of the frame angularly displaced by one normal angle from the direction of the stationary shafts of the frame; another retention pin opposed to the heart cam held in contact with the frame and serving to energize the frame in the other direction; and a motor means serving to rotate in one fixed direction the heart cam held in contact with the frame and causing the frame to be oscillated around the stationary shafts of the frame, whereby the two heart cams are simultaneously rotated by the two motor means to have the beam provide scanning of speed linearity on the surface of the test specimen.

2. the optical scanning apparatus according to claim 1, further comprising detectors capable of non-contact detection of the amounts of displacements in the reciprocating motions of the two retention pins, which are opposed to the respective free ends of the two retention pins across a fixed space.

* * * * *